(12) United States Patent
Grosse et al.

(10) Patent No.: US 8,112,790 B2
(45) Date of Patent: Feb. 7, 2012

(54) METHODS AND APPARATUS FOR AUTHENTICATING A REMOTE SERVICE TO ANOTHER SERVICE ON BEHALF OF A USER

(75) Inventors: Eric Henry Grosse, Berkeley Heights, NJ (US); Victor C Zandy, Crofton, MD (US)

(73) Assignee: Alcatel Lucent, Paris (FR)

( * ) Notice: Subject to any disclaimer, the term of this patent is extended or adjusted under 35 U.S.C. 154(b) by 1283 days.

(21) Appl. No.: 11/171,513

(22) Filed: Jun. 30, 2005
(Under 37 CFR 1.47)

(65) Prior Publication Data
US 2007/0005964 A1 Jan. 4, 2007

(51) Int. Cl.
*H04L 9/32* (2006.01)
*H04L 9/08* (2006.01)

(52) U.S. Cl. .............. 726/6; 726/10; 713/171; 713/170; 713/168; 380/286

(58) Field of Classification Search .................. 726/6, 4, 726/5, 8, 10, 3; 713/168, 170, 171; 380/277, 380/286
See application file for complete search history.

(56) References Cited

U.S. PATENT DOCUMENTS 6,643,774 B1 * 11/2003 McGarvey ..................... 713/155
7,290,278 B2 * 10/2007 Cahill et al. ...................... 726/6

OTHER PUBLICATIONS

Cox, R. et al. "Security in Plan 9". Proceedings of the 11th USENIX Security Symposium, Aug. 5-9, 2002.*

* cited by examiner

*Primary Examiner* — Zachary A Davis
(74) *Attorney, Agent, or Firm* — Ryan, Mason & Lewis, LLP

(57) ABSTRACT

Methods and apparatus are provided for authenticating a remote service to another service on behalf of a user. A user client authorizes a remote application client to perform one or more actions with a server on behalf of the user client. The user client provides one or more keys to a remote authentication service; receives an identifier of the remote application client, where the remote authentication client is remote from the server; and notifies the remote authentication service that the remote application client is authorized to obtain a response from the remote authentication service regarding a challenge from the server, where the response is based on at least one of the one or more keys stored by the remote authentication service on behalf of the user client. The remote application client provides a challenge that is received from a server that the remote application client is attempting to access for the user client and an identifier of the user client to a remote authentication service and receives a response to the challenge from the remote authentication service, wherein the response is based on one or more keys stored by the remote authentication service on behalf of the user client.

17 Claims, 3 Drawing Sheets

FIG. 3

AUTHENTICATION ACCOUNT DATABASE – 300

| ACCOUNT NAME | $KEY_1$ | ... | $KEY_N$ |
|---|---|---|---|
| $F_{USER}$ | PROTOCOL; USER; PASSWORD; OWNER; ROLE | | |
| ⋮ | | | |
| $F_{N_1}$ | | | |
| ⋮ | | | |
| $F_{N_N}$ | | | |

FIG. 4

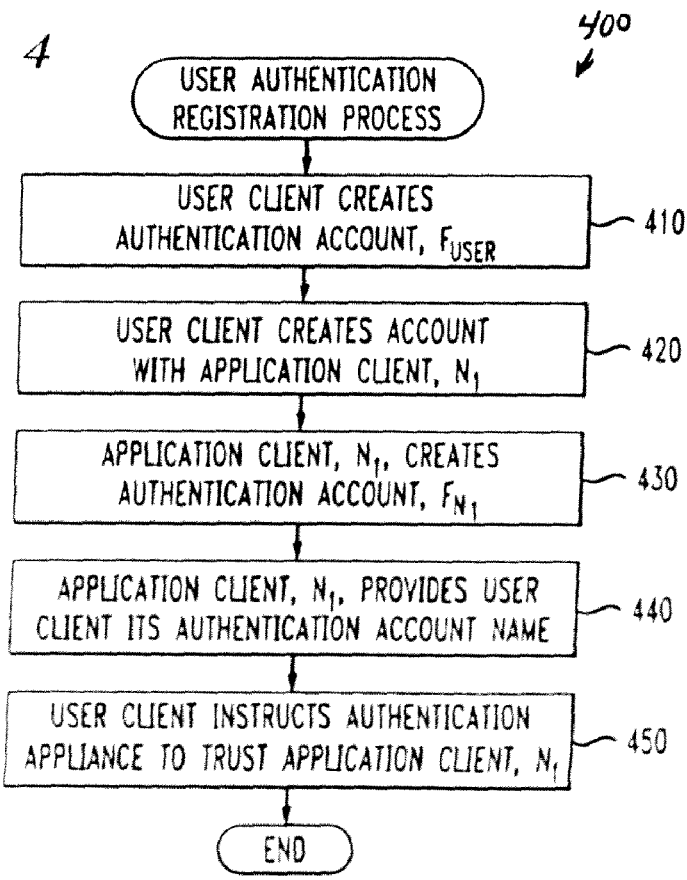

400

- USER AUTHENTICATION REGISTRATION PROCESS
- 410 — USER CLIENT CREATES AUTHENTICATION ACCOUNT, $F_{USER}$
- 420 — USER CLIENT CREATES ACCOUNT WITH APPLICATION CLIENT, $N_1$
- 430 — APPLICATION CLIENT, $N_1$, CREATES AUTHENTICATION ACCOUNT, $F_{N_1}$
- 440 — APPLICATION CLIENT, $N_1$, PROVIDES USER CLIENT ITS AUTHENTICATION ACCOUNT NAME
- 450 — USER CLIENT INSTRUCTS AUTHENTICATION APPLIANCE TO TRUST APPLICATION CLIENT, $N_1$
- END

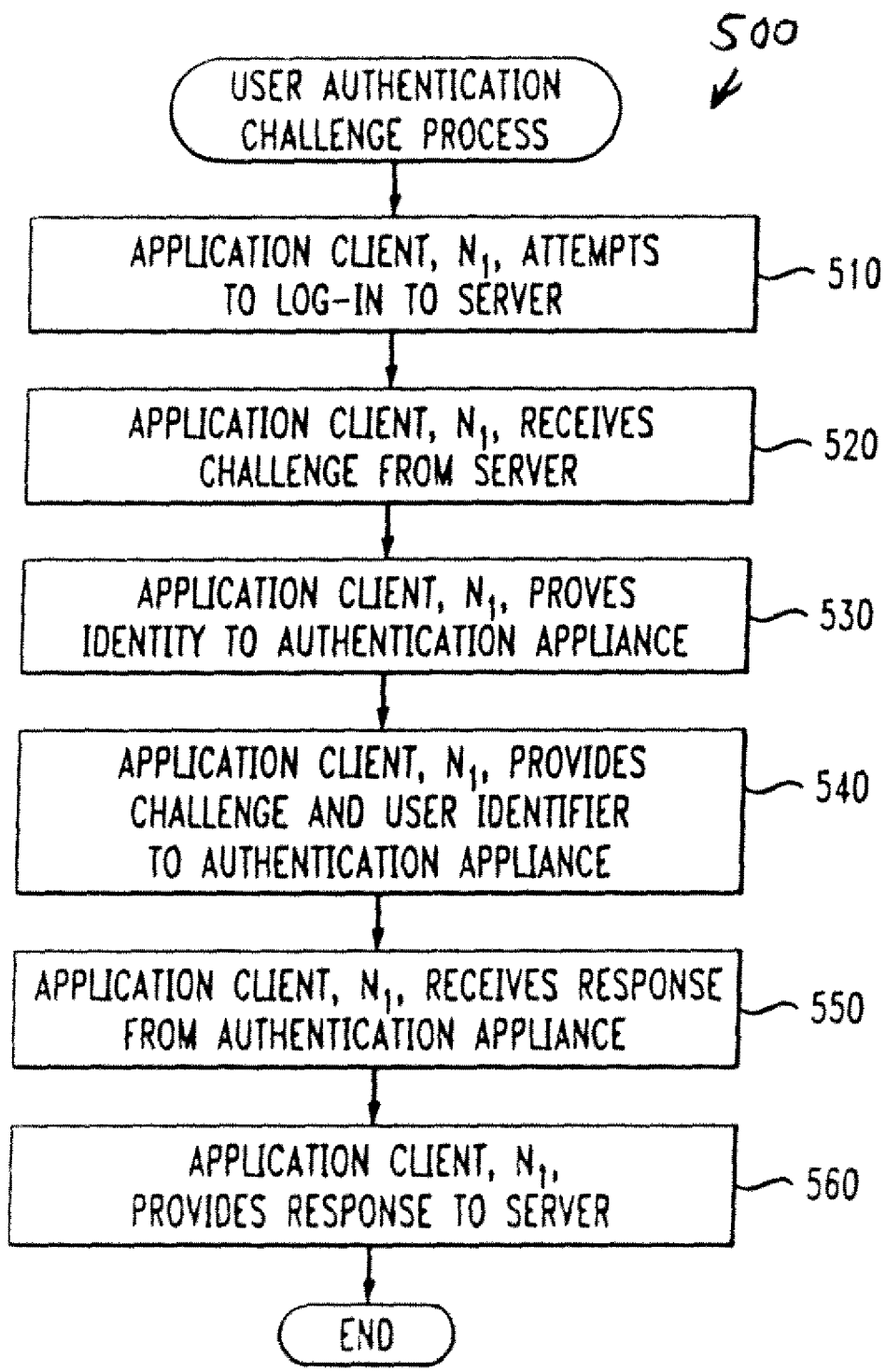

US 8,112,790 B2

METHODS AND APPARATUS FOR AUTHENTICATING A REMOTE SERVICE TO ANOTHER SERVICE ON BEHALF OF A USER

FIELD OF THE INVENTION

The present invention relates to techniques for management of secure user information, and, more particularly, to methods and apparatus authenticating remote services on behalf of a user.

BACKGROUND OF THE INVENTION

As a computer user engages in transactions with an increasing number of secure servers over a network, it becomes increasingly difficult for the user to remember required information for each server, such as an account name and password. In order to make this task more manageable, many users either employ the same password with multiple servers or write their account information and passwords down in some form that can be obtained by another. In each case, the goal of maintaining the security of the user's account information is compromised.

A number of techniques have been proposed or suggested for helping users to securely manage their account information and passwords. Lucent Technologies, Inc. of Murray Hill, N.J., for example, provides an architecture for securely managing user account information, referred to as the Factotum™ security system. Factotum stores a copy of the keys of a user and negotiates security transactions with applications and system services.

The Factotum runs on the user's computer and interacts with a network-based repository of personal credential information, referred to as the "Secure Store." The Secure Store stores one or more passwords or keys for a user. The Factotum application acts as a "trusted proxy" for the user and has permission to use the stored keys to access online services or applications on behalf of the user. In this manner, the user is not required to input the same information at every new secure server visited by the user, or to remember different passwords for each accessed online service.

While the Factotum security system provides a convenient and secure method for users to manage their account information on their own computer, users are increasingly engaging remote applications on remote machines to take actions on their behalf. For example, a user may authorize a remote spam filtering application to process email stored by another remote email server on behalf of the user. In addition, due to license restrictions for a given application specifying where the application may be executed, the application may execute on behalf of a user from a remote machine. In any case, these remote applications or services often must engage in secure transactions on behalf of the user, even when the user is not present or actively participating.

Currently, in order for users to engage a remote application on a remote machine to take actions on their behalf, the users must provide their credentials to the remote application, thus requiring the users to trust each remote application and potentially compromising security. A need therefore exists for more secure techniques that allow users to manage their account information and passwords with one or more remote applications. A further need exists for more centralized trusted repositories for storing secure user account information that is required to communicate with one or more remote applications.

SUMMARY OF THE INVENTION

Generally, methods and apparatus are provided for authenticating a remote service to another service on behalf of a user.

According to one aspect of the invention, a user client can authorize a remote application client to perform one or more actions with a server on behalf of the user client. The user client provides one or more keys to a remote authentication service; receives an identifier of the remote application client, where the remote application client is remote from the server; and notifies the remote authentication service that the remote application client is authorized to obtain a response from the remote authentication service regarding a challenge from the server, where the response is based on at least one of the one or more keys stored by the remote authentication service on behalf of the user client.

According to another aspect of the invention, a remote application client that performs one or more actions for a user client receives a challenge from a server that the remote application client is attempting to access for the user client; provides the challenge and an identifier of the user client to a remote authentication service; receives a response to the challenge from the remote authentication service, wherein the response is based on one or more keys stored by the remote authentication service on behalf of the user client; and provides the response to the server.

In addition, an authentication appliance can manage one or more keys for a user client by receiving the one or more keys from the user client; receiving a notification from the user client that a remote application client that performs one or more actions for the user client is authorized to obtain a response based on at least one of the one or more keys; receiving a challenge and an identifier of the user client from the remote application client; and providing the response to the challenge to the remote application client.

Among other benefits of the invention, the user client is not required to participate in a transaction performed by the remote application client on behalf of the user client. In addition, the remote application client can perform the actions on behalf of the user client without ever obtaining the one or more keys. Thus, the present invention increases the security and convenience of currently available key management techniques.

A more complete understanding of the present invention, as well as further features and advantages of the present invention, will be obtained by reference to the following detailed description and drawings.

BRIEF DESCRIPTION OF THE DRAWINGS

FIG. 3 is a sample table from an exemplary authentication account database of FIG. 2;

FIG. 4 is a flow chart describing an exemplary implementation of a user authentication registration process incorporating features of the present invention; and FIG. 5 is a flow chart describing an exemplary implementation of a user authentication challenge process incorporating features of the present invention.

DETAILED DESCRIPTION

The present invention provides an authentication framework that allows a remote service to authenticate to another service on behalf of a user. Unlike existing authentication approaches, the disclosed authentication framework does not require the user to participate in the authentication protocol or even to be present, nor to divulge his or her keys to the remote service at any time. Generally, users register with an authentication appliance incorporating features of the present invention and provide one or more secure keys that are stored by the authentication appliance. The users specify, for a given key, the set of network services that may receive a response based on the key. In addition, a user can revoke a service's access to a key without interacting with the service. According to another aspect of the invention, key access can be audited, enabling monitoring functionality, such as email notification to a user when a key is accessed.

According to one aspect of the invention, a protocol is provided for a user to securely grant a network service access to a key stored on an authentication appliance. The disclosed protocol captures scenarios in which the network service is previously unknown to the user's authentication appliance. A network service can request from an authentication appliance a list of keys that the service has been authorized by the user to access. This mechanism ties key authorization to service subscription, simplifying the implementation and usage of some network services.

Figure 1:
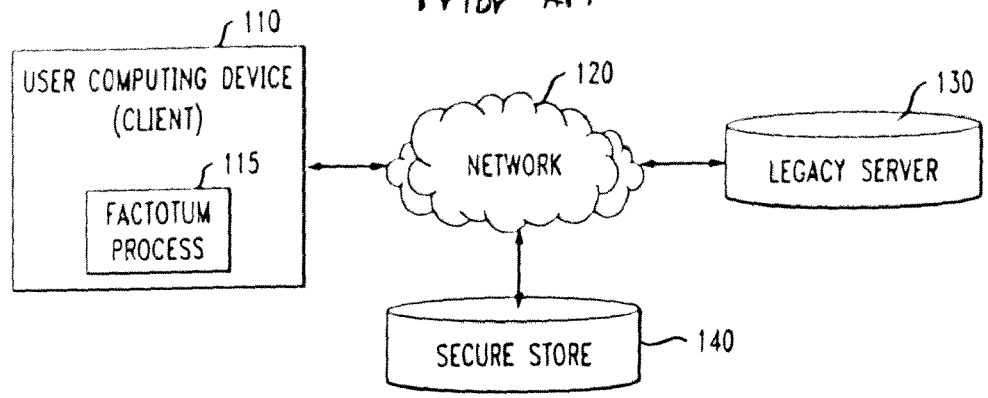
FIG. 1 illustrates a block diagram of an existing user key management system.

FIG. 1 illustrates an existing technique for secure management of user account information and passwords. As shown in FIG. 1, a user employs a user computing device 110 to communicate over a network 120 with a legacy server 130, such as a web site. The network 120 may be any combination of public or private, wired or wireless networks. The exemplary existing key management technique of FIG. 1 employs the Factotum™ security system provided by Lucent Technologies, Inc. of Murray Hill, N.J. For a detailed discussion of the Factotum™ security system, see, for example, Russ Cox et al., "Security In Plan 9," USENIX Security 2002, 3-16 (2002), incorporated by reference herein. As previously indicated, the Factotum™ security system provides an architecture for securely managing user account information. Factotum stores a copy of the keys of a user and negotiates security transactions with applications and system services. The Factotum process 115 may be implemented, for example, as a plug-in to a browser.

As shown in FIG. 1, the exemplary Factotum security system is implemented as a process 115 that executes on the user computing device 110. The Factotum process 115 runs on the user computing device 110 and interacts with a secure store 140 that is, for example, a network-based repository of personal credential information. The secure store 140 stores one or more passwords or keys for a user. The Factotum process 115 acts as a "trusted proxy" for the user and has permission to use the stored keys to access online services or applications on behalf of the user.

As previously indicated, users are increasingly engaging remote applications on remote machines to take actions on their behalf. For example, a user may authorize a remote application to access a remote email server to obtain email on behalf of the user. In addition, due to license restrictions for a given application, the application may execute on behalf of a user from a remote machine. In any case, these remote applications or services often must engage in secure transactions on behalf of the user, even when the user is not present or actively participating.

Figure 2:
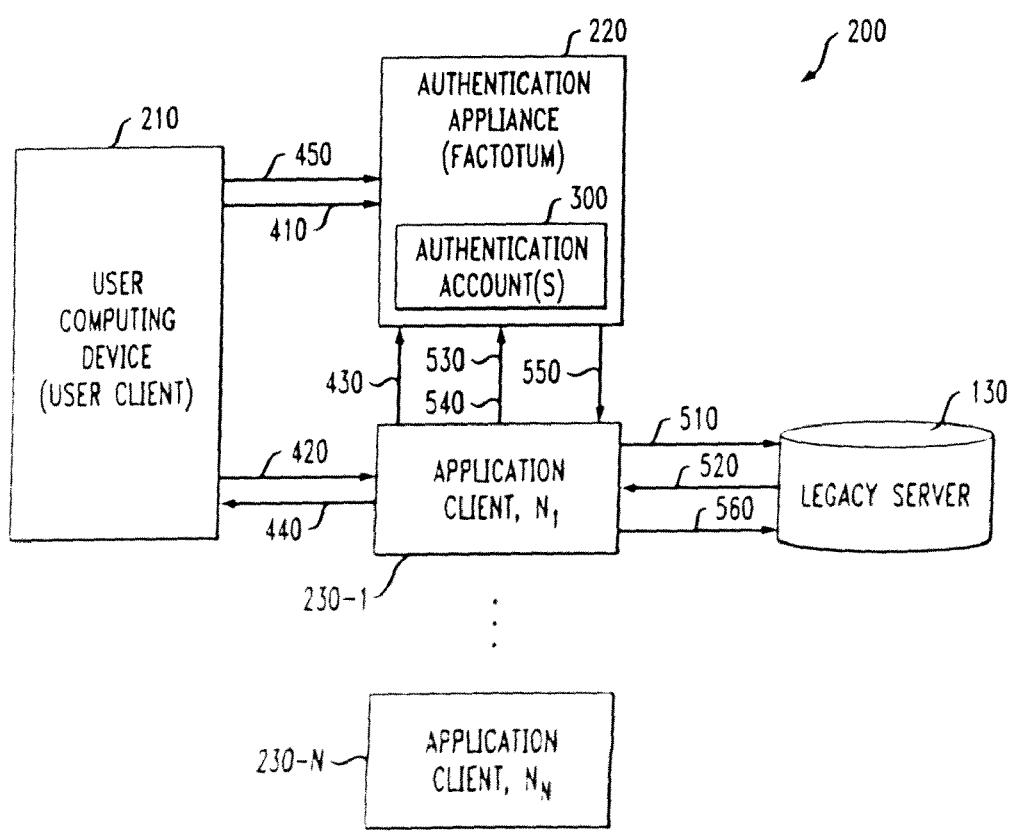
FIG. 2 illustrates a key management system according to the present invention that allows a user to manage account information and secure key information for use by one or more authorized remote services.

FIG. 2 illustrates a key management system 200 that allows a user of a user computing device 210 to manage his or her account information and passwords with one or more remote applications or services 230-1 through 230-N (hereinafter, collectively referred to as a remote application 230). The remote application 230 engages in one or more secure transactions on behalf of the user with one or more legacy servers 130. The disclosed key management system 200 provides one or more trusted repositories for storing secure user account information that is required to communicate with one or more remote applications or services.

As shown in FIG. 2 and discussed further below in conjunction with FIG. 4, the user employs the user computing device 210 to communicate over a network (not shown in FIG. 2) to register with an authentication appliance 220. The authentication appliance 220 may be embodied as the Factotum security system discussed above in conjunction with FIG. 1, as modified herein to provide the features and functions of the present invention. The user initially registers with the authentication appliance 220 to create an account and provide the user's secret credential information, such as one or more keys or passwords. As used herein, a password shall include parameters defining an RSA keypair, or other secret information employed by a user to obtain access to a restricted service, device or location. In addition, the remote application 230 registers with the authentication appliance 220 to create an account and obtains an identifier with the authentication appliance 220. Thereafter, the user computing device 210 can instruct the authentication appliance 220 to trust the remote application 230.

As shown in FIG. 2 and as discussed further below in conjunction with FIG. 3, the exemplary authentication appliance 220 maintains a directory of authentication accounts 300, that stores account information, such as a secure key, for each user account. It is noted that the numbered arrows in FIG. 2 that are labeled "4xx" or "5xx" corresponding to communications between the various entities of FIG. 2 that are discussed further below in conjunction with FIGS. 4 and 5.

Once the user and remote application 230 are registered with the authentication appliance 220 and the user has instructed the authentication appliance 220 to trust the particular remote application 230, the remote application 230 can communicate with the legacy server 130 on behalf of the user in accordance with the present invention. In particular, the remote application 230 can obtain an appropriate response from the authentication appliance 220 to a given challenge that has been issued by the legacy server 130.

It is noted that during the registration and challenge processes discussed further below in conjunction with FIGS. 4 and 5, the user and the remote application 230 will have to establish their identities with the authentication appliance 220, in a known manner. For example, the "client certificate" option of the Transport Layer Security (TLS) standard (also referred to as Secure Socket Layer (SSL)) permits a safe and convenient authentication for this purpose.

FIG. 3 is a sample table from an exemplary authentication account database 300. The authentication account database 300 is maintained by the authentication appliance 220 to store account information, such as a secure key, for each user account. As shown in FIG. 3, the exemplary authentication account database 300 is comprised of a plurality of records, each associated with a different user or service account. For each account, the authentication account database 300 identifies the account name in field 310, the authentication account database 300 maintains one or more keys, in fields 320 through 330. For each key, the information contained in the exemplary authentication account database 300 comprises: a protocol identifier (e.g., the authentication protocol for the key); a user identifier (e.g., an account name that identifies the user for the key); password (the secret that, once stored, is never revealed); owner (identifies users, such as remote applications 230, that can use this key); and role (i.e., whether the protocol is for the client or server side).

FIG. 4 is a flow chart describing an exemplary implementation of a user authentication registration process 400 incorporating features of the present invention. As shown in FIG. 4, the user authentication registration process 400 is initiated during step 410, when the user client creates an authentication (Factotum) account, $F_{user}$. In addition, the user client creates an account with the application client, $N_1$, during step 420.

The application client, $N_1$, also creates an authentication (Factotum) account, $F_{N_1}$, during step 430. It is important to note that the user authentication registration process 400 is not meant to convey an order on the sequence of operations. The application client, $N_1$, for example, can create an authentication account prior to the user's creation of an account.

When the user desires to authorize the application client, $N_1$, to act on behalf of the user, the application client, $N_1$, provides the user client its authentication account name during step 440. The user client then instructs the authentication appliance 220 to trust the application client, $N_1$, during step 450.

FIG. 5 is a flow chart describing an exemplary implementation of a user authentication challenge process 500 incorporating features of the present invention. As shown in FIG. 5, the user authentication challenge process 500 is initiated during step 510 when the application client, $N_1$, attempts to log-in to a legacy server 130. The application client, $N_1$, then receives a challenge from the legacy server 130 during step 520. In order to obtain the response to the challenge the application client, $N_1$, then communicates with the authentication appliance 220 in accordance with the present invention.

The application client, $N_1$, provides its identity to the authentication appliance 220 during step 530. Thereafter, the application client, $N_1$, provides the challenge from the legacy server 130 and the user identifier to the authentication appliance 220 during step 540.

The authentication appliance 220 uses the challenge and the stored secret information to compute the response. The application client, $N_1$, then receives the response from the authentication appliance 220 during step 550. The application client, $N_1$, provides the response to the legacy server 130 during step 560 to obtain access on behalf of the user.

System and Article of Manufacture Details

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

It is noted that the storage of user credentials in the memory of the authentication appliance 220 may be done in encrypted form, so that physical theft of the device or sloppy disposal does not put the user credentials at risk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

We claim:

1. A method performed by a user client to provide authorization to a remote application client that performs one or more actions with a server for said user client, comprising:

providing one or more keys to a remote authentication service;

receiving an identifier of said remote application client, wherein said remote application client is remote from said server; and notifying said remote authentication service, wherein said notification authorizes said remote authentication service to perform an authentication procedure without participation from said user client, wherein said authentication procedure comprises receiving a challenge from said remote application client without participation from said user client, generating a credential without participation from said user client based on said challenge received from said remote application client, and issuing said credential to said remote application client without participation from said user client, wherein said credential is based on at least one of said one or more keys stored by said remote authentication service on behalf of said user client.

2. The method of claim 1, further comprising the step of creating an account with said remote authentication service.

3. The method of claim 1, further comprising the step of establishing an identity of said user client to said remote authentication service.

4. The method of claim 1, wherein said remote application client can perform said actions on behalf of said user client without obtaining said one or more keys.

5. The method of claim 1, further comprising the step of notifying said user client when said remote application client obtains said credential.

6. A method performed by a remote application client that performs one or more actions for a user client, comprising:

receiving a challenge from a server that said remote application client is attempting to access for said user client, wherein said remote application client is remote from said server, wherein a notification authorizes a remote authentication service to perform an authentication procedure without participation from said user client, wherein said authentication procedure comprises receiving a challenge from said remote application client without participation from said user client, generating a credential without participation from said user client based on said challenge received from said remote application client, and issuing said credential to said remote application client without participation from said user client;

providing said challenge from said server and an identifier of said user client to said remote authentication service during a remote application transaction;

receiving said credential to said challenge from said remote authentication service, wherein said response is based on one or more keys stored by said remote authentication service on behalf of said user client; and providing said credential to said server.

7. The method of claim 6, further comprising the step of creating an account with said remote authentication service.

8. The method of claim 6, further comprising the step of establishing an identity of said remote application client to said remote authentication service.

9. The method of claim 6, wherein said remote application client can perform said actions on behalf of said user client without obtaining said one or more keys.

10. A method performed by a remote authentication service for managing one or more keys for a user client, comprising:

receiving said one or more keys from said user client;

receiving a notification from said user client, wherein said notification authorizes said remote authentication service to perform an authentication procedure without participation from said user client, wherein said authentication procedure comprises receiving a challenge from a remote application client without participation from said user client, generating a credential without participation from said user client based on said challenge received from said remote application client, and issuing said credential to said remote application client without participation from said user client, wherein said credential is based on at least one of said one or more keys, wherein said remote application client is remote from said server;

receiving said challenge and an identifier of said user client from said remote application client; and providing said credential to said challenge to said remote application client.

11. The method of claim 10, further comprising the step of establishing an identity of said user client.

12. The method of claim 10, further comprising the step of establishing an identity of said remote application client.

13. The method of claim 10, wherein said remote application client can perform said actions on behalf of said user client without obtaining said one or more keys.

14. The method of claim 10, further comprising the step of notifying said user client when said credential is provided to said remote application client.

15. An apparatus implemented by a remote authentication service for managing one or more keys for a user client, the apparatus comprising:

a tangible readable recordable memory; and at least one processor, coupled to the memory, operative to:

receive said one or more keys from said user client;

receive a notification from said user client, wherein said notification authorizes said remote authentication service to perform an authentication procedure without participation from said user client, wherein said authentication procedure comprises receiving a challenge from a remote application client without participation from said user client, generating a credential without participation from said user client based on said challenge received from said remote application client, and issuing said credential to said remote application client without participation from said user client, wherein said credential is based on at least one of said one or more keys, wherein said remote application client is remote from said server;

receive said challenge and an identifier of said user client from said remote application client; and provide said credential to said challenge to said remote application client.

16. The apparatus of claim 15, wherein said processor is further configured to establish an identity of said user client and said remote application client.

17. The apparatus of claim 15, wherein said remote application client can perform said actions on behalf of said user client without obtaining said one or more keys.

* * * * *